United States Patent [19]

Rieger et al.

[11] Patent Number: 4,759,110
[45] Date of Patent: Jul. 26, 1988

[54] PROCESS FOR SHRINK-FIT LOCKING A CYLINDRICAL CERAMIC PART INTO A FLANGE MADE OF A FERROUS MATERIAL, AND CERAMIC-METAL COMPOSITE BODIES

[75] Inventors: Wolfhart Rieger, Buch; Jakob Widrig, Winterthur, both of Switzerland

[73] Assignee: Metoxit AG, Thayngen, Switzerland

[21] Appl. No.: 849,036

[22] Filed: Apr. 7, 1986

[30] Foreign Application Priority Data

Apr. 10, 1985 [CH] Switzerland .................. 1524/85

[51] Int. Cl.$^4$ ..................... B23P 11/02; F16B 4/00
[52] U.S. Cl. ..................... 29/447; 29/156.5 R; 29/DIG. 35; 285/381; 403/273
[58] Field of Search ............ 29/447, 459, 156.5 R, 29/DIG. 35; 285/381; 403/273

[56] References Cited

U.S. PATENT DOCUMENTS

| | | | |
|---|---|---|---|
| 4,297,779 | 11/1981 | Melton et al. | 403/273 X |
| 4,531,269 | 7/1985 | LaBouff | 29/447 X |
| 4,573,250 | 3/1986 | Miller et al. | 29/447 |
| 4,624,484 | 11/1986 | Wilson | 285/381 X |

FOREIGN PATENT DOCUMENTS

| | | | |
|---|---|---|---|
| 372153 | 8/1921 | Fed. Rep. of Germany | 29/447 |
| 2734747 | 2/1979 | Fed. Rep. of Germany | 403/273 |

OTHER PUBLICATIONS

"Unified Theory of Thermal Shock Fracture Initiation and Crack Propagation in Brittle Ceramics," By D. P. H. Hasselman, *Journal of The American Ceramic Society*, vol. 52, No. 11 (Nov., 1969).

*Primary Examiner*—Gil Weidenfeld
*Assistant Examiner*—Steven C. Bishop
*Attorney, Agent, or Firm*—Bachman & LaPointe

[57] ABSTRACT

The tensile loading of a ceramic-metal joint, made by shrink-fit locking a cylindrical ceramic component into a flange of ferrous material in the axial direction of the ceramic component can be improved by undersizing the diameter D of the bore of the flange by 13–27 $\mu$m making it, at room temperature, this much smaller than the diameter d of that part of the ceramic component to be attached to the flange by shrink-fit locking, by preparing the cylindrical surface of the said part of the ceramic component with a surface roughness Ra of 0.05–0.2 $\mu$m and the surface of the bore in the flange with a roughness Ra of 0.4–0.8 $\rho$m, and by heating the flange, before fitting it to the ceramic part, to a temperature such that, after fitting together the ceramic component and the flange, the resultant stresses produced on cooling the assembly to room temperature are below the yield strength $R_{po.2}$ of the ferrous material, and the said temperature of heating is below the Wöhler temperature of the ceramic material.

10 Claims, 1 Drawing Sheet

PROCESS FOR SHRINK-FIT LOCKING A CYLINDRICAL CERAMIC PART INTO A FLANGE MADE OF A FERROUS MATERIAL, AND CERAMIC-METAL COMPOSITE BODIES

BACKGROUND OF THE INVENTION

The present invention relates to a process for shrink-fit locking a cylindrical ceramic part into a flange made of a ferrous material, in particular a ceramic piston in a steel holding means connected to a power drive in conveyance facilities for liquid and gaseous media, by introducing part of the ceramic component into a bore in the heated flange and cooling the same to room temperature.

Ceramic-metal composite components are finding increasing application in the machine construction industry, especially in internal combustion engines or pumping facilities that run at very high speeds. In such cases one makes use of the advantageous properties of the ceramic material viz., the resistance to high temperatures and temperature changes and/or the wear resistance. In the field of high pressure pumping in particular ceramic pistons of various diameters find application for densifying fluids for cleaning operations. In the case of such ceramic pistons the foot must be connected to a flange which drives the piston to effect its purpose. The flange in most cases is made of a ferrous material and the connection is made via bolting, adhesive bonding or shrink-fitting. Because of the hgh frequency of the backwards and forwards movement of the piston, a strong tensile force acts on the piston in the direction of its longitudinal axis; in even small pistons of e.g. 20 mm diameter this force can amount to 8000 N. For reasons of dimensions, bolted connections can only make use of bolts which are not able to withstand the tensile forces produced at high frequencies. Where form-fitting contact between ceramic and flange is used along with an adhesive, the force that can be transferred from the steel to the ceramic is below the tensile loading level that arises when operating in the high frequency range. Also state-of-the-art shrink-fit locking is not able to withstand the above mentioned loading. The performance of machines with ceramic pistons is therefore markedly limited by the quality of the metal-ceramic connection.

If the connection is weakened, for example by a screw breaking, the ceramic piston is immediately released and damages the piston housing to such an extent that the pumping facility is no longer usable.

In view of the foregoing it is the object of the present invention to develop a process for shrink-fit locking a cylindrical, in particular a ceramic piston in a steel holder connected to a drive in a facility for conveying fluid or gaseous media, by introducing part of the ceramic component into a bore in a heated flange and cooling the same to room temperature, by which process a metal-ceramic connection is assured that does not exhibit the previously mentioned disadvantages; in particular, in the case of piston diameters of typically 20-30 mm the aim is to produce connections which are capable of withstanding forces of 4000 N per cm$^2$ of ceramic-metal contact area, acting in the direction of the central axis of the piston.

SUMMARY OF THE INVENTION

The foregoing object is achieved by way of the present invention wherein, at room temperature, the diameter D of the bore of the flange is, with respect to the diameter d of that part of the ceramic component to be attached to the flange by shrink-fit locking, undersized by 13-27 $\mu$m, the cylindrical surface of the ceramic component which is to come into contact with and so be locked in to the flange is prepared such that it has a roughness Ra of 0.03-0.2 $\mu$m, the surface of the bore hole in the flange a roughness Ra of 0.4-0.8 $\mu$m, and the flange is heated to a temperature such that, after fitting together the ceramic compound and the flange and subsequently cooling the assembly to room temperature, the resulting forces are below the yield strength $R_{po.2}$ of the ferrous material, said temperature of heating being below the Wöhler temperature of the ceramic material which may be defined as the critical or maximum temperature from which a ceramic product can be cooled down by rapid quench with losing its strength.

As a result of the surface finish of the ceramic and steel parts prepared according to the present invention, coefficients of friction of at least 0.5 are achieved; together with the undersizing selected in accordance with the present invention the frictional resistance results in a preselected level of force which is necessary for the piston to be pulled out of the flange, said force being above the tensile force experienced in service.

The small undersizing of the flange diameter calls for only relatively low preheating temperatures, as a rule below 200° C. which is far below the thermal shock level for most ceramics. The flange can be provided with a relief notch in order that uniform stresses are produced in the region of clamping.

BRIEF DESCRIPTION OF THE DRAWINGS

Further advantages, features and details of the invention are revealed in the following description of exemplified embodiments and with the aid of the schematic drawings wherein.

DETAILED DESCRIPTION

Figure 1:
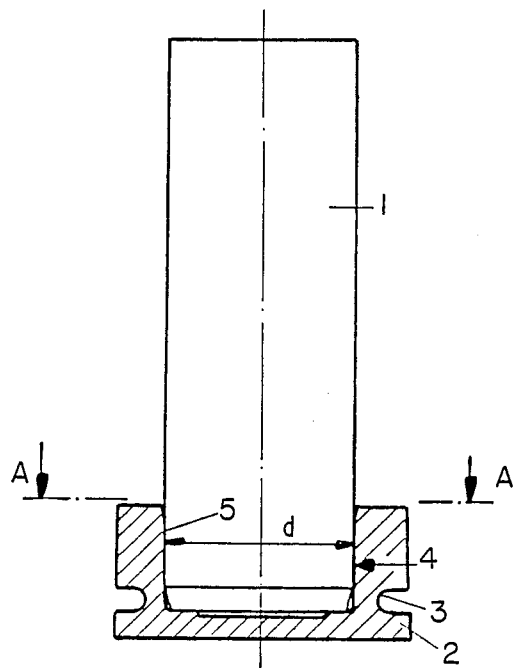
FIG. 1 is a cross-section through a ceramic-metal composite body.
Figure 2:
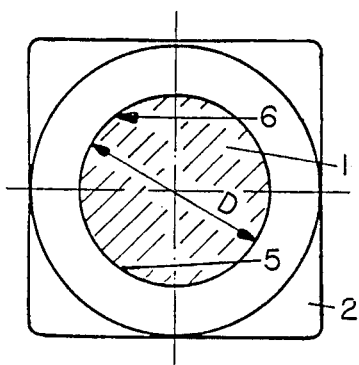
FIG. 2 is the ceramic-metal composite body shown in FIG. 1 sectioned along the line A—A.

A cylindrical ceramic piston 1, for example essentially made of corundum, is shrink-fit locked into a steel holder 2 which features a relief notch 3. The cylindrical surface 4 of the ceramic piston 1 coming into contact with the holder 2 was prepared with a surface roughness Ra of 0.1 $\mu$m. Usefully the rest of the ceramic piston surface is prepared in the same manner. The surface 6 of the bore 5 in the holder 2 was prepared with a roughness Ra of 0.8 $\mu$m. Before the parts 1 and 2 are fitted together the bore 5 in holder 2 is of slightly smaller diameter D than diameter d of the part of the ceramic piston 1 which resides in the bore 5 after the parts have been fitted together. The difference in the two diameters D, d, i.e. the undersizing of the flange diameter according to the invention is between 13 and 27 $\mu$m, and is preferably 20 $\mu$m. Of course outside the bore 5 the ceramic piston 1 can also have other diameters than the part residing in the bore 5.

Optimum shrink-fit locking of the ceramic piston 1 to the steel holder 2 was obtained with a ceramic piston diameter d of 21.965-21.970 mm and diameter D of bore 5 in holder 2 of 21.943-21.952 mm, at the same time the surface 4 of the ceramic piston 1 coming into contact with the holder 2 exhibits a roughness Ra of 0.1 $\mu$m and the surface 6 of the bore 5 in the holder 2 a roughness Ra of 0.8 μm. The shrinkage of the holder 2 into the ceramic piston 1 was performed by heating the holder 2 to a temperature of 190° C. As a result there was a play of approx 20 μm between the ceramic piston 1 and the bore 5 in the holder 2. The shrink-fit locking of the two parts was achieved by simply introducing the ceramic piston 1 into the bore 5 in holder 2 and then cooling.

The force necessary to separate the ceramic piston 1 and the steel holder 2 was measured with an Amsler tensile testing machine; four composite parts produced in the same manner were tested. The following results were obtained:

| Trial | Undersizing (μm) | Separating force (N/cm$^2$) |
|---|---|---|
| 1 | 13 | 2.010 |
| 2 | 15 | 2.516 |
| 3 | 16 | 2.640 |
| 4 | 27 | 4.100 |

The coefficient of friction μo calculated from these results is at least 0.5. This value considerably exceeds the usual values of 0.1–0.15 for ceramic-steel joints of this kind. In contrast to the conventional manner of manufacturing such a ceramic-metal composite body, in which the flange features for example clamps and/or screws to effect the joining, the composite body according to the invention can be manufactured in a simple manner.

What is claimed is:

1. A process for shrink-fit locking a cylindrical ceramic component into a flange component of ferrous material comprising:
   providing a flange component having a bore of diameter D at substantially room temperature;
   roughening the inside surface of said bore;
   providing a cylindrical ceramic component having an outside diameter d at substantially room temperature wherein d is greater than D;
   roughening the outside surface of a portion of said cylindrical ceramic component;
   heating said flange component to a temperature such that diameter D is greater than or equal to diameter d;
   placing said roughened portion of said cylindrical ceramic component within said bore having said roughened inside surface of said flange component so as to form an assembly; and
   cooling said assembly to room temperature such that said flange component shrink-fits about said cylindrical ceramic component.

2. A process according to claim 1 wherein said bore roughening step includes roughening the inside surface of said bore to a roughness of between Ra 0.4 to 0.8 μm.

3. A process according to claim 2 wherein said outside surface portion roughening step includes roughening the outside surface of said portion of said cylindrical ceramic component to a roughness of between Ra 0.05 to 0.2 μm.

4. A process according to claim 1 including providing the diameter D at room temperature of between d minus 27 μm and d minus 13 μm.

5. An assembly produced by the process of claim 1.

6. An assembly according to claim 5 wherein said flange component is made of steel.

7. A process according to claim 1 including providing the diameter D at room temperature of d minus 20 μm.

8. A process for shrink-fit locking a cylindrical ceramic component into a flange component of ferrous material comprising:
   providing a flange component having a bore of diameter D at substantially room temperature;
   providing a cylindrical ceramic component having an outside diameter d at substantially room temperature wherein d is greater than D;
   heating said flange component to a temperature of less than the Wohler temperature of the cylindrical ceramic component;
   placing a portion of said cylindrical ceramic component within said bore of said flange component so as to form an assembly; and
   cooling said assembly to room temperature such that said flange component shrink-fits about said cylindrical ceramic component.

9. An assembly which includes:
   a flange component made of steel;
   said flange component having a bore of diameter D at substantially room temperature and a relief notch; and
   said assembly being produced by a process for shrink-fit locking a cylindrical ceramic component into said flange component which comprises (a) providing said flange component having said bore of diameter D at substantially room temperature; (b) providing a cylindrical ceramic component having an outside diameter d at substantially room temperature wherein d is greater than D; (c) heating said flange component to a temperature such that diameter D is greater than or equal to diameter d; (d) placing a portion of said cylindrical ceramic component within said bore of said flange component so as to form an assembly; and (e) cooling said assembly to room temperature such that said flange component shrink-fits about said cylindrical ceramic component.

10. An assembly according to claim 9 wherein said ceramic component is made at least in part of corundum.

* * * * *